Patented June 25, 1946

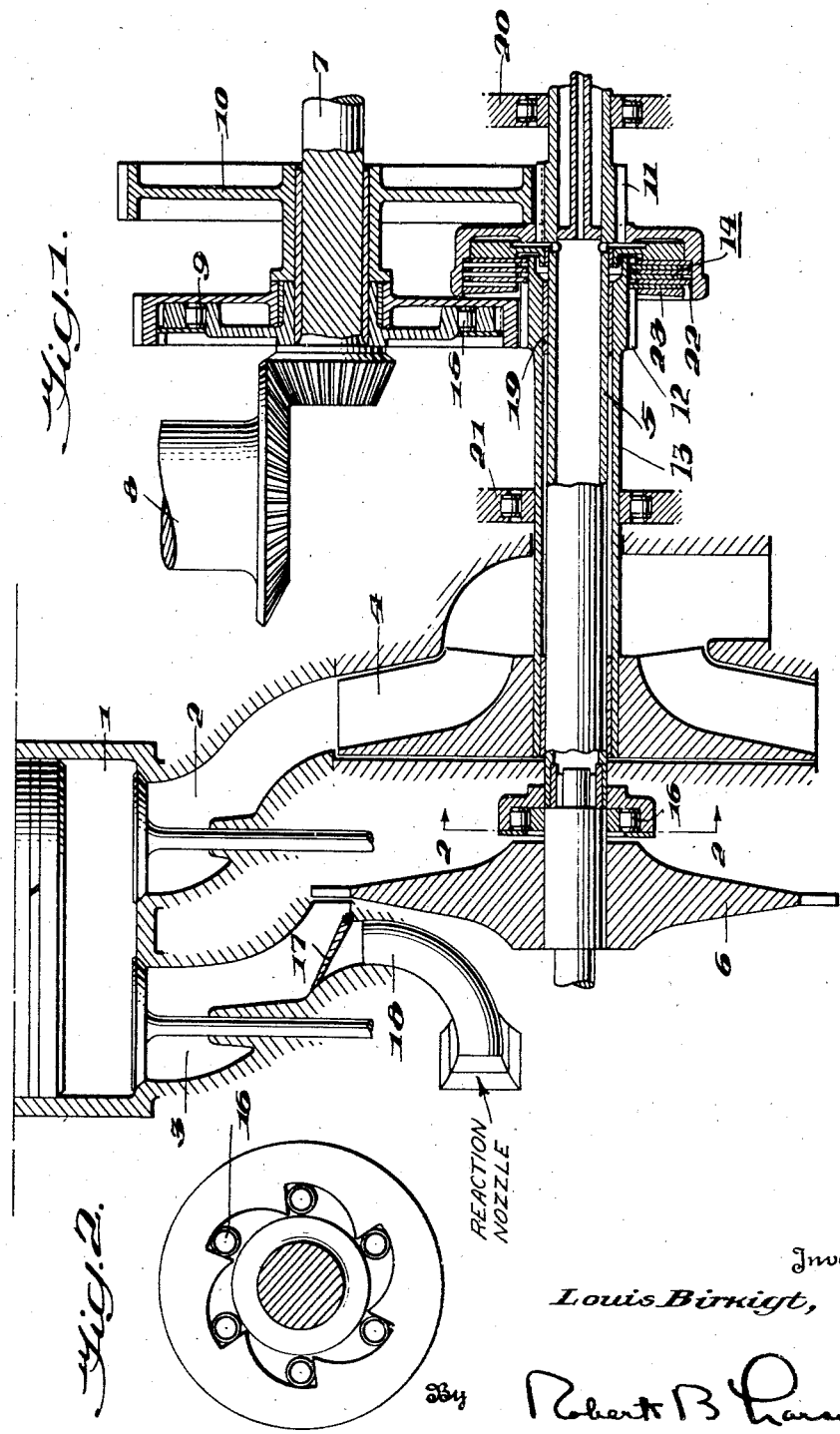

2,402,725

UNITED STATES PATENT OFFICE 2,402,725

INTERNAL-COMBUSTION ENGINE

Louis Birkigt, Versoix, Geneva, Switzerland

Application September 22, 1942, Serial No. 459,323
In France May 22, 1942

7 Claims. (Cl. 60—13)

This invention relates to internal combustion engines provided with a supercharger and refers more particularly to aircraft engines adapted to operate at variable altitudes.

The invention primarily consists in mechanically connecting the supercharger with the engine itself through a change-speed gearing, and also with a gas turbine carried by a shaft driven at constant speed with respect to the engine shaft, as for example, through a gear train.

Another feature of this invention concerns a supercharged engine wherein the supercharger may be connected at will either with the engine shaft proper or with a gas turbine geared to a shaft driven at a constant speed with respect to the speed of the engine shaft.

In the accompanying drawing:

Fig. 1 is a diagrammatic view principally in section showing one embodiment of the invention, and Fig. 2 is a view showing the structure of the two unidirectional or free wheeling devices on line 2—2 of Fig. 1.

The engine proper comprises a number of cylinders such as 1, for example of the inverted type, each cylinder having an inlet pipe 2 and an outlet or exhaust pipe 3. A centrifugal compressor or supercharger 4 is provided to feed air or an explosive mixture under pressure into pipe 2.

There is also provided a spindle 5 rotatably supported by appropriate bearings, 19 and 20 the spindle being disposed co-axially with respect to supercharger 4 and also with respect to a tubular shaft 13 carrying the same. Shaft 13 is provided with a pinion 12 while spindle 5 carries another pinion 11 smaller in diameter, as shown. The shaft 13 is supported by bearings such as those indicated by the reference numeral 21.

Pinions 11 and 12 are in mesh with two gear wheels, respectively 10 and 9, carried by a shaft 7 geared to the engine shaft proper 8, through a pair of bevel gears, as illustrated.

Gear wheel 10 is directly keyed on shaft 7 while gear wheel 9 is supported by the latter through a unidirectional gear or free-wheel 15 only permitting transmission of torque from shaft 7 to wheel 9.

A clutch device 14 is provided between the shaft 13 and the spindle 5. This clutch device may be of any of the well known types, such as that illustrated. The type illustrated includes two series of spaced disks disposed alternately with respect to each other. One of the series of disks 22 is connected with the spindle 5 while the other series 23 is connected with the shaft 13. Oil under pressure from any source such as the engine lubricating system is applied to move one of the series of disks into engagement with the other thus effecting the clutching and thereby coupling the spindle 5 and shaft 13. This type of clutch is well known per se.

The exhaust gases from pipe 3 are controlled by means of a movable vane 17 and are directed either to turbine 6 or to an exhaust nozzle 18 whence they issue into the atmosphere and help to propel the craft by reaction effect.

When the aircraft leaves the ground or flies at low altitudes, clutch 14 is disengaged. Supercharger 4 is thus driven by the engine shaft 8 through free-wheel 15, which is then operative, and gears 9 and 12. Its speed is relatively low, which is favourable and permits engine operation at full throttle. Turbine 6, which is permanently geared with the engine through gears 10 and 11 therefore rotates at a higher speed than supercharger 4, delivers an additional power which helps the engine and increases the total efficiency.

At high altitudes clutch 14 is rendered operative and supercharger 4 is directly connected with turbine 6. It is therefore rotated at high speed and uses at least a part of the power from turbine 6. Free wheel 15 then becomes inoperative, as gear 9 rotates more rapidly than shaft 7.

In the event the exhaust gas turbine becomes inactive, which may occur under certain conditions of altitudes and of engine speed, the supercharger is still driven at high speed by the engine until normal turbine operation is resumed.

There is preferably provided between turbine 6 and spindle 5 a unidirectional or free wheel device 16 so arranged as to permit torque transmission from turbine 6 to shaft 8, but not in the opposite direction. When turbine 6 is inoperative it may thus remain at standstill or rotate at low speed instead of being positively rotated at high speed by the engine shaft.

It will be understood that the above description only shows an embodiment of my invention, the details of which may vary within the ambit of the appended claims.

I claim:

1. In a supercharged internal combustion engine an engine shaft; a rotary supercharger adapted to feed a gaseous medium under pressure into said engine; a tubular shaft carrying said rotary supercharger; a spindle passing through said tubular shaft co-axially to the same, said spindle and said tubular shaft being loose with respect to each other; gear means to connect said spindle with said engine shaft; an exhaust gas turbine carried by said spindle; a gearing driven by said engine shaft; and means to connect at will said tubular shaft either to said spindle or to said gearing.

2. In a supercharged internal combustion engine an engine shaft; an exhaust gas turbine geared with said shaft; a rotary supercharger adapted to feed a gaseous medium under pressure into said engine; a gearing between said engine shaft and said rotary supercharger, said gearing being adapted to drive said rotary supercharger at a lower speed than said exhaust gas turbine; a unidirectional device interposed in said gearing to permit power transmission from said engine shaft to said rotary supercharger; and clutch means to connect at will said rotary supercharger with said turbine to cause said rotary supercharger to rotate at the same speed as said turbine.

3. In a supercharged internal combustion engine an engine shaft; a rotary supercharger adapted to feed a gaseous medium under pressure into said engine; a tubular shaft carrying said rotary supercharger; a spindle passing through said tubular shaft, said spindle and said tubular shaft being loose with respect to each other; gear means to connect said spindle with said engine shaft; an exhaust gas turbine carried by said spindle; a gearing between said engine shaft and said tubular shaft, said last-named gearing being adapted to drive said tubular shaft at a lower speed than said spindle; a unidirectional device interposed in said last-named gearing to permit power transmission from said engine shaft to said tubular shaft; and clutch means to connect at will said tubular shaft with said spindle.

4. In a supercharged internal combustion engine an engine shaft; a first gearing transmission comprising a gear wheel driven by said engine shaft and a pinion in engagement with said gear wheel; a second gearing transmission also comprising a gear wheel driven by said engine shaft and a pinion in engagement with said last-named gear wheel, said second-named pinion being rotated by said engine shaft at a lower speed than said first-named pinion; a unidirectional device in said second gearing adapted for torque transmission from said engine shaft to said second-named pinion; an exhaust gas turbine connected with said first-named pinion; a rotary supercharger connected with said second-named pinion; and clutch means to connect said first-named pinion directly to said rotary supercharger.

5. In a supercharged internal combustion engine as claimed in claim 4, said first-named and said second-named pinions being disposed in co-axial relation.

6. In a supercharged internal-combustion engine as claimed in claim 4, said exhaust gas turbine being carried by a spindle also carrying said first-named pinion, and said rotary supercharger being carried by a tubular shaft co-axially loose on said spindle and also carrying said second-named pinion.

7. A supercharged internal combustion engine as set forth in claim 4, and in which the connection between said exhaust gas turbine and said first-named pinion includes unidirectional motion transmitting means.

L. BIRKIGT.